(12) United States Patent
Keating et al.

(10) Patent No.: US 8,570,344 B2
(45) Date of Patent: Oct. 29, 2013

(54) AUGMENTED REALITY DIRECTION ORIENTATION MASK

(75) Inventors: Virginia Walker Keating, San Diego, CA (US); Joel Simbulan Bernarte, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 628 days.

(21) Appl. No.: 12/753,701

(22) Filed: Apr. 2, 2010

(65) Prior Publication Data

US 2011/0242090 A1  Oct. 6, 2011

(51) Int. Cl.
*G09G 5/00* (2006.01)
(52) U.S. Cl.
USPC .......................................... 345/633; 345/419
(58) Field of Classification Search
USPC ................................................. 345/633, 419
See application file for complete search history.

(56) References Cited

U.S. PATENT DOCUMENTS

| 2007/0035563 A1 | 2/2007 | Biocca et al. |
| 2009/0002391 A1 | 1/2009 | Williamson et al. |

OTHER PUBLICATIONS

Feiner et al., "Windows on the World: 2D Windows for 3D Augmented Reality", Nov. 1993, Proceedings of the 6th Annual ACM Symposium on User Interface Software and Technology, UIST '93, pp. 145-155.*
Scherdtfeger B. et al., "Supporting Order Picking with Augmented Reality", 7th IEEE/ACM International Symposium on Mixed and Augmented Reality, ISMAR 2008, Sep. 2008, pp. 91-94.*
Giant Bomb, "Giant Bomb: Heads Up Display", Mar. 27, 2009.*
International Searching Authority, "Written Opinion of the International Searching Authority", Aug. 2012.*
International Searching Authority, "International Search Report", Aug. 2012.*
Liarokapis et al., "Navigating within the urban environment using location and orientation based services", European Navigation Conference 2006, 15 pages.
Wither et al., "Pictorial depth cues for outdoor augmented reality", Ninth IEEE International Symposium on Wearable Computers (2005), 8 pages.
Chittaro et al., "3D Location-pointing as a navigation aid in virtual environments", Proceedings of the working conference on Advanced visual interfaces (2004), 8 pages.
Narzt et al., "Augmented reality navigation systems", Universal Access in the Information Society, vol. 4, Issue 3 (2006), pp. 177-187.

* cited by examiner

*Primary Examiner* — Maurice L McDowell, Jr.
(74) *Attorney, Agent, or Firm* — Jennifer M. Pascua (57) ABSTRACT

An augmented reality device provides a virtual mask that surrounds the viewer and includes a variation that provides information about the direction to a target item. The variation, which may be a variation in transparency, color, geometric shape, texture, material, lighting, or shading, is associated with the position of the target item so that orientation of the variation in the virtual mask does not change with respect to the direction of the target item. A portion of the virtual mask that is in the direction that the viewer is facing is displayed over the real-world image with the variation in the virtual mask providing information to the viewer about the direction of the target item. When the viewer rotates with respect to the target item, a different portion of the virtual mask that is in the current field of view is displayed.

38 Claims, 7 Drawing Sheets

AUGMENTED REALITY DIRECTION ORIENTATION MASK

BACKGROUND

A common means to determine the location of a device is to use a satellite position system (SPS), such as the well-known Global Positioning Satellite (GPS) system or Global Navigation Satellite System (GNSS), which employ a number of satellites that are in orbit around the Earth. Position measurements using SPS are based on measurements of propagation delay times of SPS signals broadcast from a number of orbiting satellites to an SPS receiver. Once the SPS receiver has measured the signal propagation delays for each satellite, the range to each satellite can be determined and precise navigation information including 3-dimensional position, velocity and time of day of the SPS receiver can then be determined using the measured ranges and the known locations of the satellites.

Knowledge of the location of a device has many uses, one of which is known as augmented reality. Augmented reality combines real-world imagery with computer generated data, such as graphics or textual information. Augmented reality may be useful for activities such as navigation or simply orientating oneself within an environment.

One of the first and most difficult steps in navigation and information discovery is physically orienting oneself in the correct direction. In order to make use of data in augmented reality, the user generally needs to find and face the target item with the camera. For data or links, the target item is not visible unless the camera is facing the correct direction. For navigation, incorrect orientation results in the user initiating navigation in the wrong direction.

Current augmented reality methods for directing the user to turn to face the target item include the use of directional elements such as arrows. For example, augmented reality systems may use two or three dimensional arrows in the center or edge of the user's view, indicating rotate left or right. Another directional element that is currently used is a top view radar type display that indicates the relative distance and direction to target items.

Current methods of providing orientation information have several problems, however. For example, directional arrows do not provide information with respect to how far one should turn to face the target element. Accordingly, it is difficult to tell how far to turn. Moreover, if the user turns quickly, there is no indication when to slow down so as not to over shoot the desired target item or direction. Further, the use of top view radar displays is distracting as users find it difficult to interpret or determine its relevance and to relate the top view to the user's actual surroundings. When used for navigation, current orientation methods give the user a sense of urgency to orient themselves to the target item causing the user to engage in potentially dangerous behavior, e.g., not facing the direction of travel.

SUMMARY

An augmented reality device provides a virtual mask that surrounds the viewer and includes a variation that provides information about the direction to a target item. The variation, which may be a variation in transparency, color, geometric shape, texture, material, lighting, or shading, is associated with the position of the target item so that orientation of the variation in the virtual mask does not change with respect to the direction of the target item. A portion of the virtual mask that is in the direction that the viewer is facing is displayed over the real-world image with the variation in the virtual mask providing information to the viewer about the direction of the target item. When the viewer rotates with respect to the target item, a different portion of the virtual mask that is in the current field of view is displayed.

DETAILED DESCRIPTION

Figure 1:
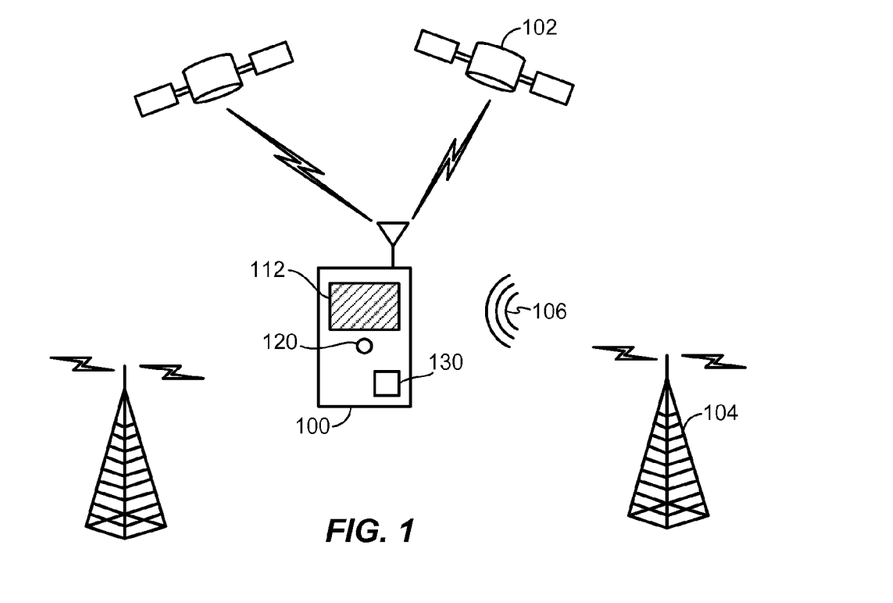
FIG. 1 illustrates an example of an augmented reality device in the form of a mobile platform that provides a virtual mask overlaid on a real-world image to provide orientation information to the user.

FIG. 1 illustrates an example of an augmented reality device in the form of a mobile platform 100 that provides a subtle virtual mask overlaid on the image in the display 112 to provide orientation information to the user. The mobile platform 100 may be used for navigation based on determining its latitude and longitude using signals from a satellite positioning system (SPS), which includes satellite vehicles 102, or any other appropriate source for determining position including cellular towers 104 or wireless communication access points 106. The mobile platform 100 includes a camera 120 to generate images of the physical real-world environment, as well sensors 130, such as a digital compass, accelerometers or gyroscopes, that can be used to determine the orientation of the mobile platform 100.

The virtual mask that is overlaid on the image shown in the display 112 is a computer generated, three-dimensional cylinder or sphere that is centered on the mobile platform 100 and aligned with a target item. For example, the mask may provide a clear view of the real-world image when the mobile platform 100 faces the target item. The mask may provide an increasingly altered view of the real-world image as the mobile platform 100 rotates away from the target item. For example, angled sides of the clear area of the mask may be used to provide information to the user about the location of the target item with respect to the mobile platform's current orientation. Accordingly, the user is provided with easily interpreted but subtle and non-distracting orientation information.

As used herein, a mobile platform refers to a device such as a cellular or other wireless communication device, personal communication system (PCS) device, personal navigation device (PND), Personal Information Manager (PIM), Personal Digital Assistant (PDA), laptop or other suitable mobile device which is capable of providing an augmented reality view of the user's environment. The mobile platform may be completely or partially mobile, for example, a mobile platform may be held at a fixed position but allowed to rotate. The mobile platform may be capable of receiving wireless communication and/or navigation signals, such as navigation positioning signals. The term "mobile platform" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile platform" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile platform."

A satellite positioning system (SPS) that may be used with the mobile platform 100 typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs) 102, illustrated in FIG. 1. For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass).

In accordance with certain aspects, position determination of the mobile platform 100 is not restricted to using global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Moreover, the mobile platform 100 is not limited to use with an SPS, but may use position determination techniques implemented in conjunction with various wireless communication networks, including cellular towers 104 and from wireless communication access points 106, such as a wireless wide area network (WWAN), a wireless local area network (WLAN), a wireless personal area network (WPAN), and so on. Alternative methods of position determination may also be used, such as object recognition using "computer vision" techniques. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

Figure 2:
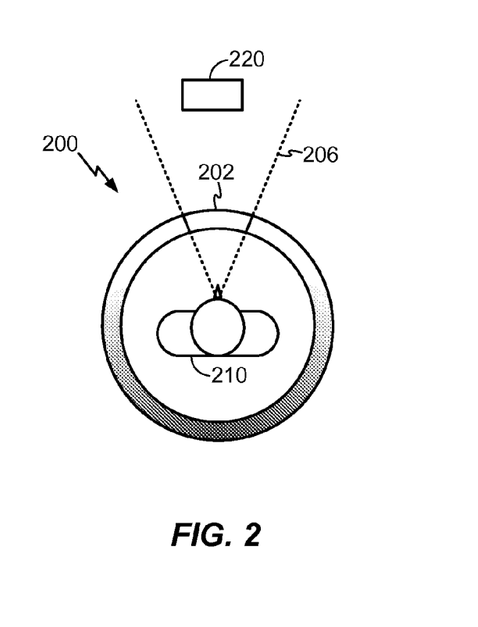
FIGS. 2 and 3 illustrate schematically the placement of a virtual mask around a user.
Figure 3:
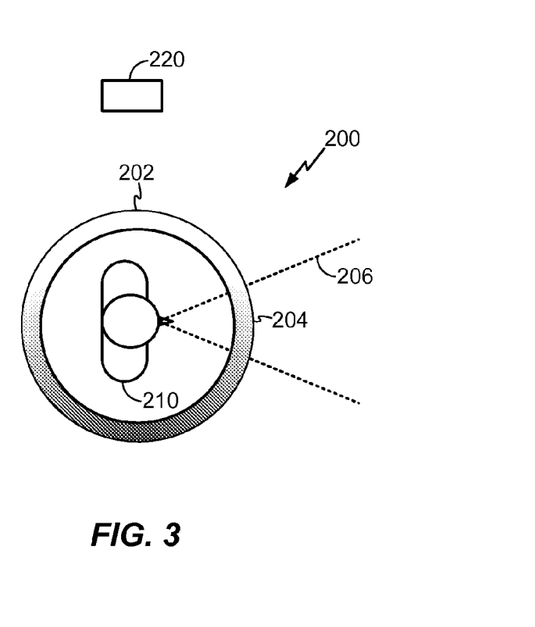

FIGS. 2 and 3 illustrate schematically the placement of a virtual mask 200 around a user 210 by the mobile platform 100. It should be understood that FIGS. 2 and 3 do not illustrate what will be shown in the display 112 of the mobile platform 100, but illustrates functionally how the mask 200 operates. FIGS. 2 and 3 show that the mask 200 is centered on the user 210 and includes a feature, such as a variation in the transparency of the mask, that indicates the direction to the target item 220. The target item 220 may be a place, object, general direction, person, or other similar item and may be stationary or moving. As illustrated in FIGS. 2 and 3, the most transparent portion 202 (illustrated as the white portion) of the mask 200 is directed towards the target item 220 from the user's 210 position. The variation in the level of transparency of the mask 200 is intended to illustrate the function of providing orientation information to the user 210 and not necessarily how the orientation information is provided, i.e., by increasing/decreasing the transparency of the view. For example, if desired, the transparency level may be held constant, but the area of transparency may vary. The user's field of view, i.e., the field of view of camera 120, is illustrated with lines 206, and only the portion of the mask 200 that is within the user's field of view 206, i.e., transparent portion 202 in FIG. 2 and the less-transparent portion 204 in FIG. 3, will be displayed over the real-world image produced by the camera 120 in the display 112. As can be seen in FIGS. 2 and 3, the orientation of the mask 200 is independent of the orientation of the user 210. For example, in FIG. 2, the user 210 faces the target item 220, while in FIG. 3 the user faces 90 degrees away from the target item 220 and is, thus, facing a less-transparent portion 204 of the mask 200. Both FIG. 2 and FIG. 3, however, illustrate the transparent portion 202 of the mask 200 is associated with the target item 220 in that it is aligned with the target item and the alignment is preserved regardless of the orientation of the user.

Figure 4:
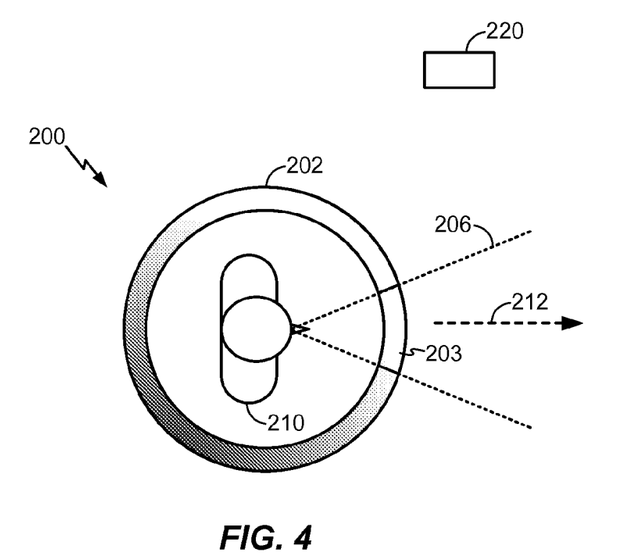
FIGS. 4 and 5 illustrate schematically the placement of a virtual mask around a user and show the effect on the virtual mask as the user moves laterally with respect to a target item.
Figure 5:
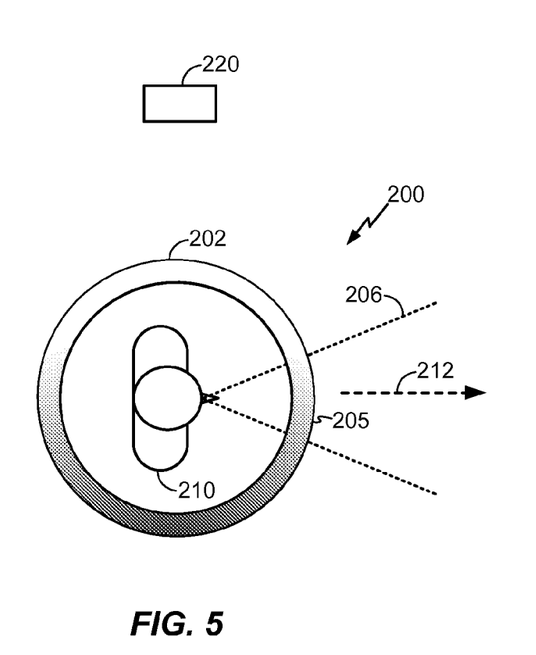

FIGS. 4 and 5 as similar to FIGS. 2 and 3, but show the effect on the mask 200 as the user 210 travels along a direction of travel 212. As can be seen, the mask 200 remains centered on the user 210 and, thus, moves with the user past the target item 220. The transparent portion 202 of the mask 200, however, continues to be aligned with the target item 220 as the user 210 and mask 200 move past the target item 220. Thus, in FIG. 4, the transparent portion 202 of the mask 200 is shown as being approximately 45 degrees from direction of travel 212 and is slightly out of the field of view 206 of the user. Accordingly, in FIG. 4, portion 203 of the mask 200 will be displayed over the real-world image. In FIG. 5 the transparent portion 202 is nearly 90 degrees from the field of view 206 of the user 210 and, thus, a different portion 205 will be displayed over the real-world image shown in display 112.

The alignment of the portion of the virtual mask 200 that is displayed may be vertically locked to the display 112 or locked to the horizon. In other words, if a user changes the vertical orientation of the camera 120, the portion of the virtual mask 200 that is shown in display 112 may remain constant (assuming there is no horizontal rotation) when locked to the viewing screen 112. Alternatively, where the virtual mask 200 is locked to the horizon, different portions of the virtual mask are displayed as the vertical orientation of the camera 120 is changed, which may be particularly desirable when the virtual mask is a three-dimensional sphere.

The virtual mask 200 allows the user to maintain a sense of position relative to the direction of the target item. Further, the mask subtly suggests direction correction, but does not demand or require it for user orientation. Conventional techniques of orienting a user in augmented reality views, on the other hand, does not maintain relevance between the user and the target item as the user progresses and provides a sense of urgency to correct the user's orientation, which may not be safe. For example, if a shop across the street and down a block from the user is the target item, it would be unsafe for the user to face directly towards the shop for much of the trip. The user should proceed down the sidewalk on the opposite side of the street and cross the street perpendicular to traffic. Using conventional orienting techniques, however, provides the user with a sense of urgency to orient towards the target item while traveling causing the user to ignore potentially hazardous pedestrian or vehicle traffic.

Figure 6:
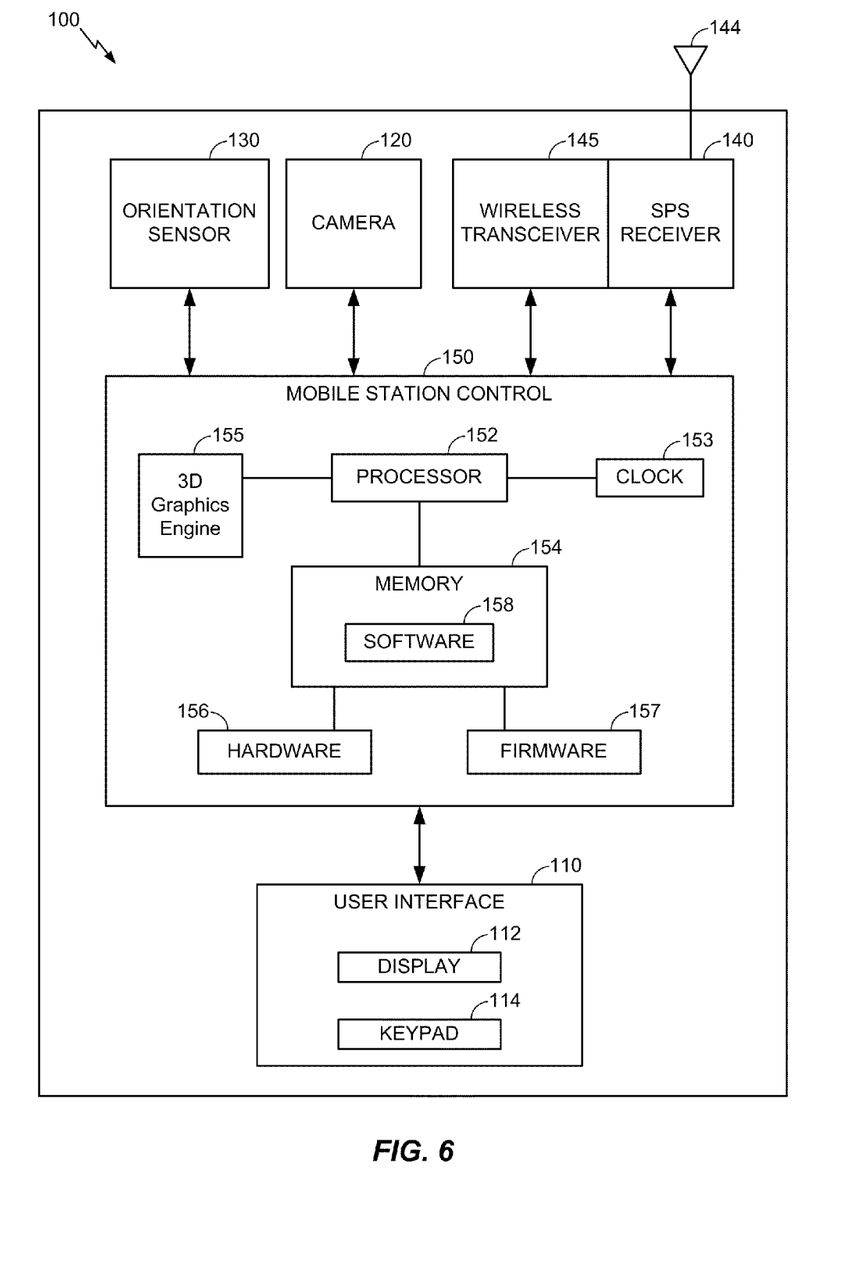
FIG. 6 is a block diagram of the mobile platform that may use the virtual mask.

FIG. 6 is a block diagram of the mobile platform 100 that may use the virtual mask 200. As illustrated in FIG. 6, the mobile platform includes a means for producing an image, such as camera 120, which may produce still or moving images that are displayed by the mobile platform 100. The mobile platform 100 also includes a means for determining the direction that the viewer is facing, such as an orientation sensor 130, e.g., a tilt corrected compass including a magnetometer, accelerometer or gyroscope.

Mobile platform 100 may include a receiver 140, such includes a satellite positioning system (SPS) receiver that receives signals from a SPS satellites 102 (FIG. 1) via an antenna 144. Mobile platform 100 also includes a wireless transceiver 145, which may be, e.g., a cellular modem or a wireless network radio receiver/transmitter that is capable of sending and receiving communications to and from a cellular tower 104 or from a wireless access point 106, respectively, via antenna 144 (or a separate antenna). If desired, the mobile platform 100 may include separate transceivers that serve as the cellular modem and the wireless network radio receiver/transmitter.

The orientation sensor 130, camera 120, SPS receiver 140, and wireless transceiver 145 are connected to and communicate with a mobile platform control 150. The mobile platform control 150 accepts and processes data from the orientation sensor 130, camera 120, SPS receiver 140, and wireless transceiver 145 and controls the operation of the devices. The mobile platform control 150 may be provided by a processor 152 and associated memory 154, a clock 153, hardware 156, software 158, and firmware 157. The mobile platform 150 may also include a means for generating the virtual mask, such as a graphics engine 155, which may be, e.g., a gaming engine, which is illustrated separately from processor 152 for clarity, but may be within the processor 152. The graphics engine 155 calculates the position and orientation of the virtual mask 200 that is displayed on an image produced by the camera 120. It will be understood as used herein that the processor 152 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

The mobile platform 100 also includes a user interface 110 that is in communication with the mobile platform control 150, e.g., the mobile platform control 150 accepts data and controls the user interface 110. The user interface 110 includes a means for displaying the images produced by the camera 120 along with overlaid computer generated mask 200, such as a digital display 112. The processor 152 controls the position and orientation of the computer generated mask 200 on the image based on the position and orientation of the mobile platform with respect to a target item. The display 112 may further display control menus and positional information. The user interface 110 further includes a means for identifying the target item, such as a keypad 114 or other input device through which the user can input information into the mobile platform 100. In one embodiment, the keypad 114 may be integrated into the display 112, such as a touch screen display. The user interface 110 may also include, e.g., a microphone and speaker, e.g., when the mobile platform 100 is a cellular telephone.

The methodologies described herein may be implemented by various means depending upon the application. For example, these methodologies may be implemented in hardware 156, firmware 157, software 158, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 154 and executed by the processor 152. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

For example, software 158 codes may be stored in memory 154 and executed by the processor 152 and may be used to run the processor and to control the operation of the mobile platform 100 as described herein. For example, a program code stored in a computer-readable medium, such as memory 158, may include program code to determine a direction that a viewer is facing; to generate a virtual mask; and to display an image of the direction that a viewer is facing and a portion of the virtual mask that is in the direction that the viewer is facing. The program code may also determine that the direction that the viewer is facing has change and to display a different portion of the virtual mask in response. Moreover, program code may determine that the position of the viewer with respect to the target item has changed and to display a different portion of the virtual mask in response.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 7:
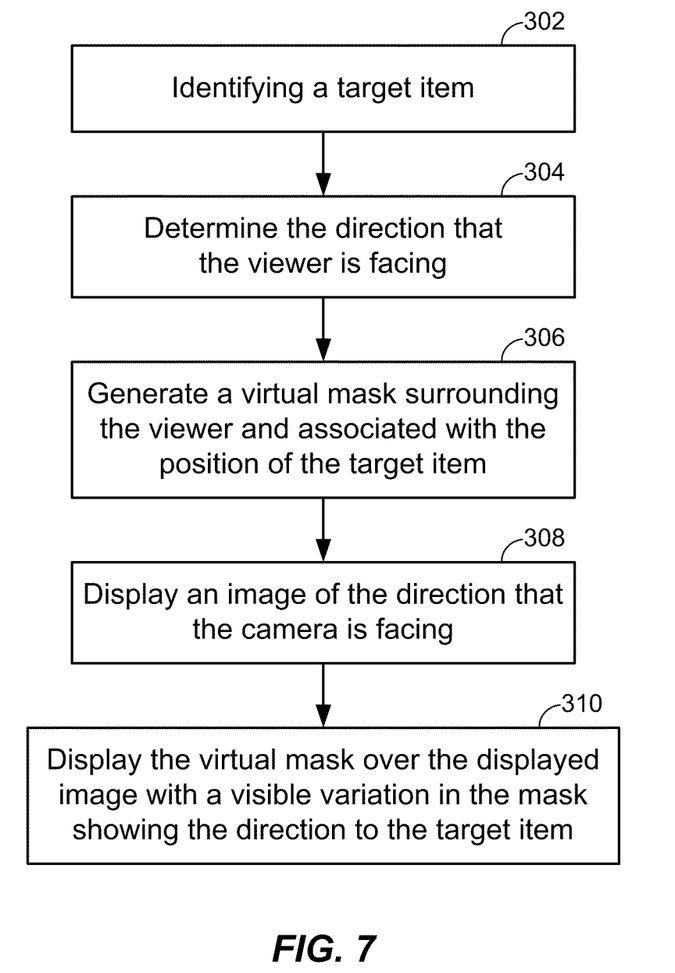
FIG. 7 is a flow chart showing a method of showing the orientation between a viewer and a target item in a display using a virtual mask.

FIG. 7 is a flow chart showing a method of showing the orientation between a viewer, as indicated by the camera view, and a target item in a display using a virtual mask. As illustrated in FIG. 7, the target item is identified (302). The target item may be identified by user selection, e.g., via interface 110, or by an external source. Identification of the target item includes determining the position of the target item with respect to the viewer. For example, the position, e.g., latitude and longitude, of the viewer may be determined using an SPS system, e.g., data from a SPS system is received by the SPS receiver 140 (FIG. 6) from which processor 152 calculates the position. If desired, the position may be determined using other techniques and devices including using data from other various wireless communication networks, including cellular towers 104 and from wireless communication access points 106 or by object recognition using computer vision techniques. The position of the target item may also be determined, e.g., by retrieving the position from a server on a network via wireless transceiver 145. For example, a user may indicate via control menus and keypad 114 that a specific destination is desired. The mobile platform 100 may then retrieve the position, e.g., latitude and longitude, of the desired destination from a server on a network via wireless transceiver 145. The position of the target item with respect to the viewer may then be determined.

The direction that the viewer is facing is determined (304), e.g., using the orientation sensor 130. It should be understood for purposes of this patent document, the viewer is presumed to be facing the same direction as that the camera is facing, i.e., the viewer is pointing the camera in the direction that the user is facing. A virtual mask 200 is generated to surround the viewer (306), e.g., by the graphics engine 155 shown in FIG. 6, at the determined position of the viewer. The generated virtual mask 200 includes a variation that provides information about the direction to the target item. The variation in the virtual mask variation is associated with the position of the identified target item (306) and is independent of the direction that the viewer is facing. Moreover, the generated virtual mask 200 is associated with the position of the viewer, so that if the viewer moves, the virtual mask moves with the viewer while maintaining the orientation between the associated variation in the mask and the target item. An image of the direction that the viewer is facing is displayed (308), e.g., as produced by the camera 120 and a portion of the virtual mask that is in the direction that the viewer is facing is displayed over the image with the variation in the mask showing the direction to the target item (310). The virtual mask may be displayed over the camera view. If desired, the camera view may be removed, e.g., so that the view is blank or filled, but the virtual mask may remain to serve as a directional compass. As the viewer rotates or changes position, the associated variation on the mask remains oriented towards the target item and, thus, the virtual mask is updated so that a different portion of the virtual mask is displayed.

The virtual mask 200 may be produced as a three dimensional object, e.g., a virtual cylinder or sphere, that surrounds the viewer in virtual space. Alternatively, the virtual mask 200 may be produced as a two-dimensional tiled image that is placed in the two-dimensional user interface layer. The two-dimensional tiled image slides, e.g., left and right, as the user rotates to emulate the three-dimensional virtual implementation, i.e., the software emulates holding the virtual mask still in space while the camera rotates.

Figure 8:
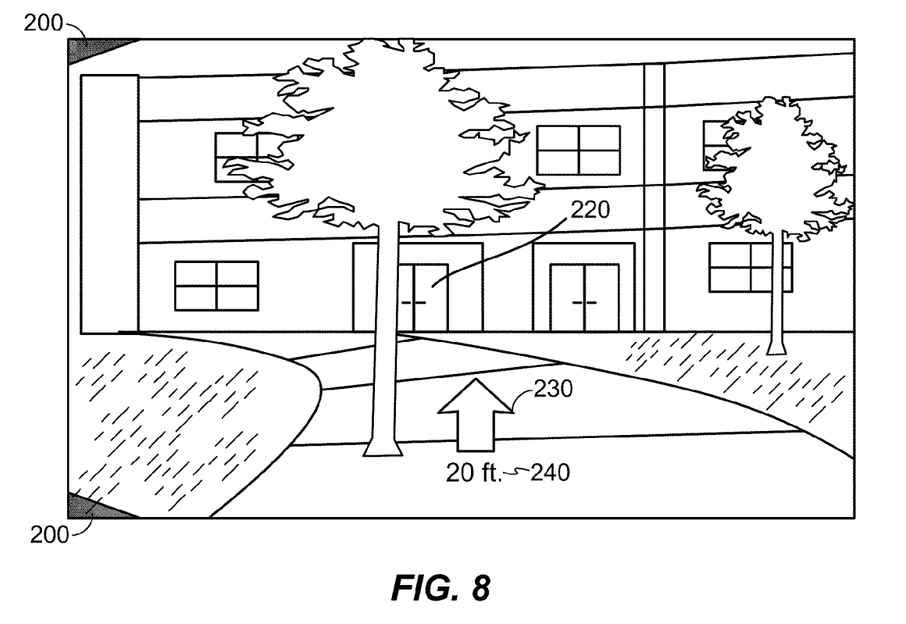
FIGS. 8, 9, 10, and 11 illustrate examples of an augmented reality image, including a virtual mask.

By way of example, FIGS. 8, 9, 10, and 11 illustrate examples of an augmented reality image, including a virtual mask 200, that is displayed to the user on the display 112. FIG. 8, for example, illustrates an image and virtual mask 200 when the user is facing almost directly towards the target item 220, which in this example is a building. As can be seen in FIG. 8, little of the virtual mask 220 can be seen in the corners of the displayed image because the user is facing towards the target item 220. If desired, additional augmented data may be displayed, such as an arrow 230 pointing towards the target item 220 and distance 240 to the target item 220.

Figure 9:
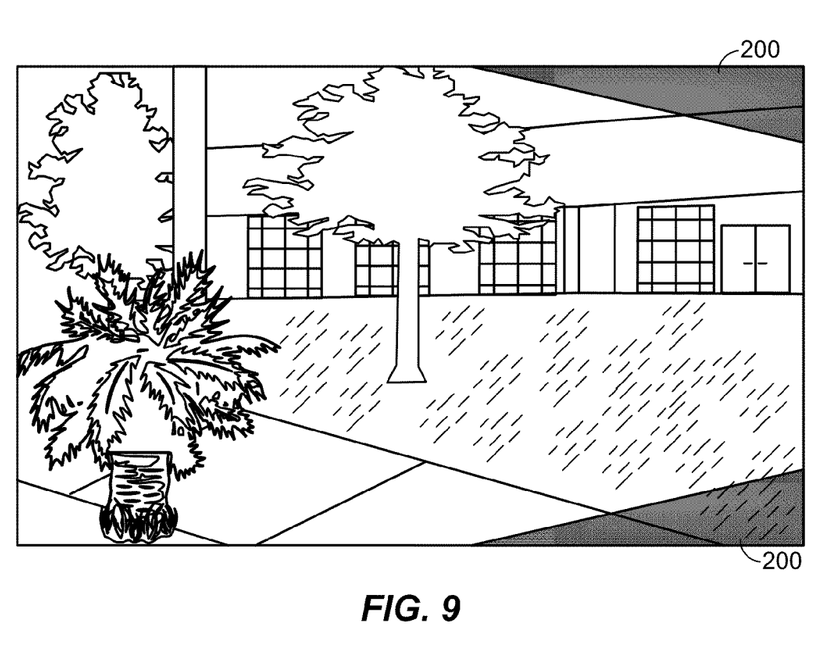
Figure 10:
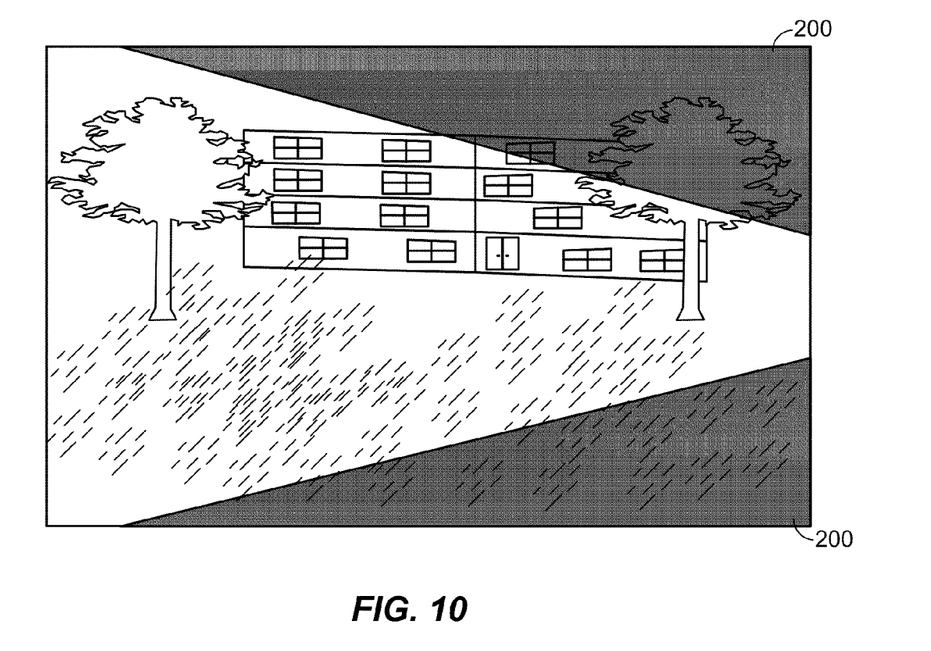
Figure 11:
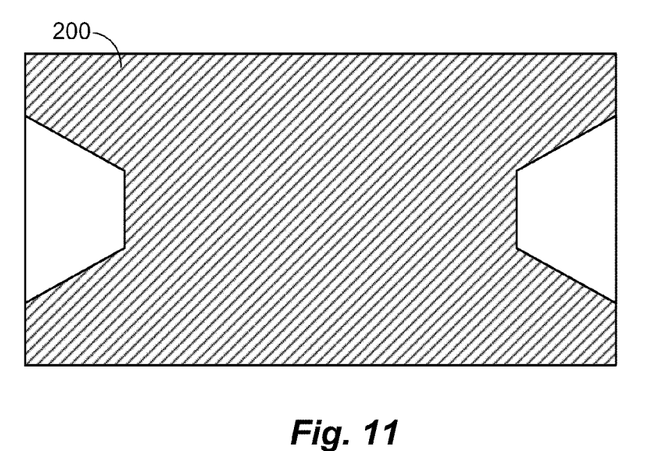
Figure 12:
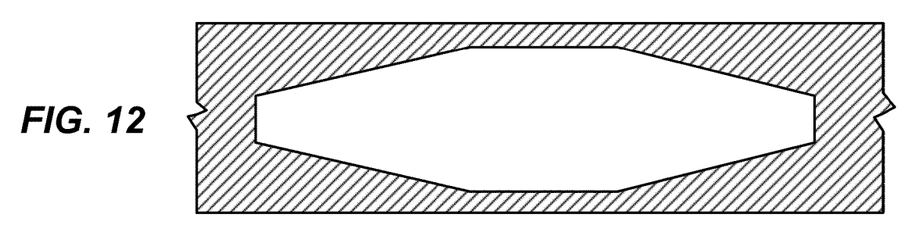
FIGS. 12, 13, 14, and 15 illustrate different examples of cylindrical virtual masks that may be used.
Figure 13:
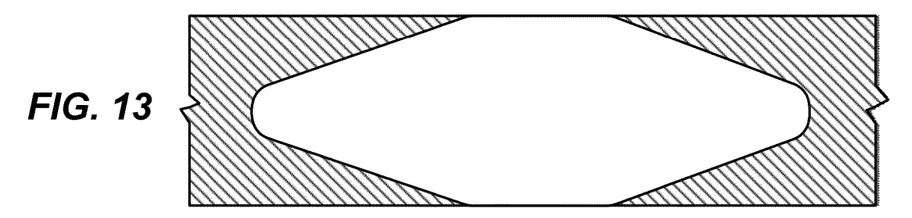
Figure 14:
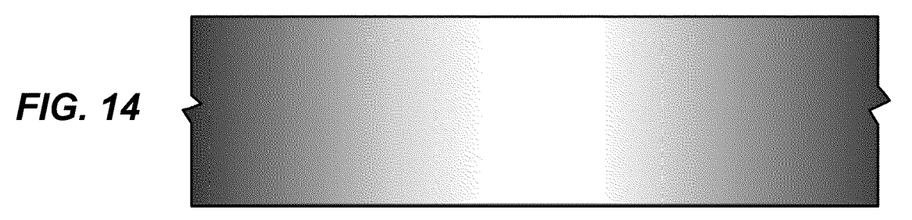
Figure 15:
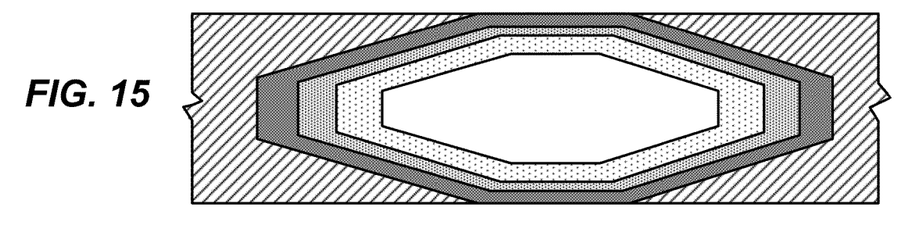

FIGS. 9 and 10 illustrate different images and different portions of the virtual mask 200 as the user rotates away (to the right) from the target item (the target item is no longer seen in FIGS. 9 and 10). As can be seen, the portion of the mask 200 displayed changes based on the orientation of the user with respect to the target item, with more of the mask being visible the further the user rotates away from the target. In one embodiment, the virtual mask is at least partially transparent so that the image of the physical world can be seen under the mask 200. As can be seen, the mask provides information about the direction of the target item, in this example by the slanted edges of the mask which suggests that the target item is towards the clearer portion of the image. For example, it can be easily determined that FIG. 10 shows the user turned further to the right with respect to the target item than in FIG. 9. FIG. 11 illustrates one example of a displayed image of the virtual mask 200 (without the underlying image) when the user is looking directly away from the target item.

FIGS. 12, 13, 14, and 15 illustrate different examples of cylindrical virtual masks that may be used. Spherical masks with similar characteristics may be used if desired. As can be seen, the virtual masks provide some indication of direction based on a variation in the mask. The variation in the mask may be the masks transparency, color, geometric shape, texture, material, lighting, shading, etc. The mask need not completely obscure the underlying image but may alter the image so that the mask is easily discernable in the display.

Some portion of the mask may always be visible to keep the orientation relevant to the user. The mask 200, thus, provides a clear indication of the orientation between the user and a target item and generally how far off the user is from the direction of the target item. Additional information may also be provided, either separately or by changing the mask to give an indication of the distance to the target item.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method of showing the orientation between a viewer and a target item in a display, the method comprising:
    displaying an image of a direction that a viewer is facing;
    determining the direction that the viewer is facing;
    generating a virtual mask surrounding the viewer, the virtual mask having a variation that provides information about the direction to a target item, the variation in the virtual mask being associated with the position of the target item so that the orientation of the variation in the virtual mask with respect to the target item does not change;
    displaying over the image a portion of the virtual mask that is in the direction that the viewer is facing, wherein the variation in the virtual mask is visible in the display to provide information to the viewer about the direction of the target item.

2. The method of claim 1, further comprising determining that the direction of the viewer has changed and displaying over the image a different portion of the virtual mask.

3. The method of claim 1, further comprising determining that the position of the viewer with respect to the target item has changed and displaying over the image a different portion of the virtual mask.

4. The method of claim 1, further comprising identifying the target item and determining the position of the target item with respect to the viewer.

5. The method of claim 1, wherein the virtual mask is one of a three-dimensional cylinder or sphere that resides in three-dimensional virtual space.

6. The method of claim 1, wherein the virtual mask comprises a two-dimensional object that slides to represent movement of a three-dimensional cylinder or sphere and that resides in a user interface layer.

7. The method of claim 1, wherein the variation in the virtual mask is at least one of transparency, color, geometric shape, texture, material, lighting, and shading.

8. The method of claim 1, where the target item may be a place, object, general direction, person, and may be stationary or moving.

9. The method of claim 1, wherein the variation in the virtual mask is displayed regardless of the direction that the user is facing.

10. The method of claim 1, wherein the variation in the virtual mask is not displayed when either the viewer is directly facing the target item or facing directly away from the target item.

11. The method of claim 1, wherein an additional visual indication is displayed to provide information regarding the target item.

12. The method of claim 11, the additional visual indication includes at least one of an arrow showing the location of the target item and an indication of the distance to the target item, the indication of the distance being at least one of a change in the virtual mask variation, a numerical value and a change in an additional visual indication.

13. The method of claim 1, wherein the alignment of the portion of the virtual mask displayed is vertically locked to the viewing screen or the horizon.

14. The method of claim 1, wherein the virtual mask is displayed over the camera view or over a blank or filled background.

15. A mobile platform comprising:
    a camera being operable to produce image in a direction that the camera is facing;
    an orientation sensor that provides data with respect to direction the camera is facing;
    a processor connected to the camera and the orientation sensor;
    memory connected to the processor;
    a display connected to the memory; and
    software held in the memory and run in the processor to cause the processor to determine the direction that the camera is facing using the data from the orientation sensor; to generate a virtual mask surrounding a position of the camera and having a variation that provides information about a direction to a target item from the position of the camera, the variation in the virtual mask being associated with a position of the target item so that the orientation of the variation in the virtual mask with respect to the position of the target item does not change; and to show on the display the image from the camera and a portion of the virtual mask that is in the direction that the camera is facing, wherein the variation in the virtual mask is visible in the display to provide information to the viewer about the direction of the target item.

16. The mobile platform of claim 15, wherein the software further causes the processor to determine that the direction that the camera is facing has changed using the data from the orientation sensor and to display a different portion of the virtual mask.

17. The mobile platform of claim 15, further comprising a position sensor that provides data regarding the position of the camera to the processor, wherein the software further causes the processor to determine that the position of the camera with respect to the target item has changed and to display a different portion of the virtual mask.

18. The mobile platform of claim 15, further comprising a user interface connected to the processor, wherein the software further causes the processor to identify the target item from data provided by the user interface.

19. The mobile platform of claim 15, wherein the virtual mask is one of a three-dimensional cylinder or sphere that resides in three-dimensional virtual space.

20. The mobile platform of claim 15, wherein the virtual mask comprises a two-dimensional object that slides to represent movement of a three-dimensional cylinder or sphere and that resides in a user interface layer.

21. The mobile platform of claim 15, wherein the variation in the virtual mask is at least one of transparency, color, geometric shape, texture, material, lighting, and shading.

22. The mobile platform of claim 15, where the target item may be a place, object, general direction, person, and may be stationary or moving.

23. The mobile platform of claim 15, wherein the variation in the virtual mask is displayed regardless of the direction that the user if facing.

24. The mobile platform of claim 15, wherein the variation in the virtual mask is not displayed when either the viewer is directly facing the target item or facing directly away from the target item.

25. The mobile platform of claim 15, wherein the software further causes the processor to display an additional visual indication to provide information regarding the target item.

26. The mobile platform of claim 25, wherein the additional visual indication includes at least one of an arrow showing the location of the target item and an indication of the distance to the target item, the indication of the distance being at least one of a change in the virtual mask variation, a numerical value and a change in an additional visual indication.

27. The mobile platform of claim 15, wherein the alignment of the portion of the virtual mask displayed is vertically locked to the viewing screen or the horizon.

28. The mobile platform of claim 15, wherein the virtual mask is displayed over the camera view or over a blank or filled background.

29. A system for accessing and updating positional information for a mobile platform comprising:
    means for producing an image of a direction that a viewer is facing;
    means for determining the direction the viewer is facing;
    means for generating a virtual mask surrounding the viewer, the virtual mask having a variation that provides information about the direction to a target item, the variation in the virtual mask being associated with the position of the target item so that the orientation of the variation in the virtual mask with respect to the target item does not change;
    means for displaying the image of the direction that the viewer is facing and displaying a portion of the virtual mask that is in the direction that the viewer is facing, wherein the variation in the virtual mask is visible in the display to provide information to the viewer about the direction of the target item.

30. The system of claim 29, further comprising a means for determining that the direction of the viewer has changed and displaying a different portion of the virtual mask.

31. The system of claim 29, further comprising a means for determining that the position of the viewer with respect to the target item has changed and displaying over the image a different portion of the virtual mask.

32. The system of claim 29, further comprising a means for identifying the target item and determining the position of the target item with respect to the viewer.

33. The system of claim 29, wherein the virtual mask is one of a three-dimensional cylinder or sphere that resides in three-dimensional virtual space.

34. The system of claim 29, wherein the virtual mask comprises a two-dimensional object that slides to represent movement of a three-dimensional cylinder or sphere and that resides in a user interface layer.

35. The system of claim 29, wherein the variation in the virtual mask is at least one of transparency, color, geometric shape, texture, material, lighting, and shading.

36. A non-transitory computer-readable medium including program code stored thereon, comprising:
    program code to determine a direction that a viewer is facing;
    program code to generate a virtual mask surrounding a position of the viewer and having a variation that provides information about a direction to a target item from the position of the viewer, the variation in the virtual mask being associated with a position of the target item so that the orientation of the variation in the virtual mask with respect to the position of the target item does not change; and
    program code to display an image of the direction that a viewer is facing and a portion of the virtual mask that is in the direction that the viewer is facing, wherein the variation in the virtual mask is visible in the display to provide information to the viewer about the direction of the target item.

37. The non-transitory computer-readable medium including program code stored thereon of claim 36, further comprising program code to determine that the direction that the viewer is facing has changed and to display a different portion of the virtual mask.

38. The non-transitory computer-readable medium including program code stored thereon of claim 36, further comprising program code to determine that the position of the viewer with respect to the target item has changed and to display a different portion of the virtual mask.

* * * * *